Feb. 9, 1937.  M. IRELAND  2,070,128
AUTOMATIC TOASTER
Filed May 24, 1934  3 Sheets-Sheet 1

INVENTOR
MURRAY IRELAND
ATTORNEYS

Feb. 9, 1937.   M. IRELAND   2,070,128
AUTOMATIC TOASTER
Filed May 24, 1934   3 Sheets-Sheet 2

INVENTOR
MURRAY IRELAND
By Paul Paul Moore
ATTORNEYS

Feb. 9, 1937.　　　　M. IRELAND　　　　2,070,128
AUTOMATIC TOASTER
Filed May 24, 1934　　　3 Sheets-Sheet 3

INVENTOR
MURRAY IRELAND
BY Paul, Paul & Moore
ATTORNEYS

Patented Feb. 9, 1937

2,070,128

UNITED STATES PATENT OFFICE 2,070,128

AUTOMATIC TOASTER

Murray Ireland, Minneapolis, Minn., assignor, by mesne assignments, to McGraw Electric Company, Chicago, Ill., a corporation of Delaware Application May 24, 1934, Serial No. 727,288

9 Claims. (Cl. 219—19)

This invention relates to new and useful improvements in automatic toasters and more particularly to electric bread toasters which are automatically operative to control the toasting operation such, for example, as disclosed in my copending application, Serial No. 437,071, filed March 19, 1930 now Patent No. 2,001,362.

Electric bread toasters of the type comprising an oven into which the bread is inserted during the toasting operation are usually provided with suitable heating elements arranged at the sides of the oven, whereby the toast is subjected to the radiant heat thereof. When the toaster is initially started and a bread slice is inserted into the oven, it usually requires a longer period of time for completing the toasting of the first slice, because of the fact that the oven must be heated before the bread can be toasted. After the first slice has been toasted, the temperature of the oven and heating elements has been raised, and from then on, successive slices will be toasted more quickly, or, in other words, the toasting period is shortened because of the oven and heating elements being hot before the bread slice is inserted in the oven. It is desirable that means be provided whereby the toasting period of the first slice may be shortened so that said slice may be toasted in substantially the same length of time as the succeeding slices.

In the present application, means is provided for quickly heating the oven, when the toaster is initially started, whereby the period required to toast the first slice is considerably shortened, to thereby cause successive slices to be toasted after which said means is rendered inoperative in substantially the same period of time as the first slice.

A further and more specific object of the invention resides in the provision of a plurality of resistance elements electrically associated with the heating elements of the toaster, and which are inoperative, when the toaster is initially started, whereby the heating elements will operate at high heat to thereby quickly heat the oven upon initial starting of the toaster, after which said auxiliary heating means are automatically connected in the circuit to thereby cause the heating elements to operate at a lower temperature, whereby the temperature of the toaster oven is maintained substantially constant, when the toaster is operated continually for a length of time, thereby assuring that the first and succeeding bread slices will be uniformly toasted.

A further object is to provide an electric toaster comprising an oven adapted to receive the bread to be toasted, and having heating elements arranged adjacent the sides thereof, and a plurality of resistance elements being connected in series with said heating elements and adapted to be successively connected in the heating circuit by a thermally operated switch mechanism, which is so constructed that when the toaster is cold, the resistance elements are automatically cut out of the heating circuit, so that when the toaster is initially started, the main heating elements will operate at high heat to thereby quickly heat the oven, after which the resistance elements are successively connected in the circuit, as the oven becomes heated, to thereby cause the heating elements to operate at lower temperature, whereby the temperature of the oven is maintained substantially constant, when once the toaster is started and continually operated.

Other objects of the invention reside in the particular arrangement of the resistance elements adjacent to the heating elements, whereby they take up very little additional space in the toaster; in the particular arrangement of the switch contacts controlling the supply of current to the resistance elements, and whereby they are successively operated to cause the heating elements to operate first at high heat, then at medium heat, and subsequently at low heat, whereby the oven is maintained at the desired toasting temperature, as long as the toaster is continually operated; and, in the provision of a thermally responsive element exposed to convection currents in the oven whereby, as the oven is initially heated, said auxiliary heating elements will automatically be successively connected in the circuit to thereby control the heating of the oven.

Other objects of the invention will appear from the following description and accompanying drawings and will be pointed out in the annexed claims.

In the accompanying drawings, there is disclosed a structure designed to carry out the various objects of the invention, but it is to be understood that the invention is not confined to the exact features shown, as various changes may be made within the scope of the claims which follow.

Figure 1:
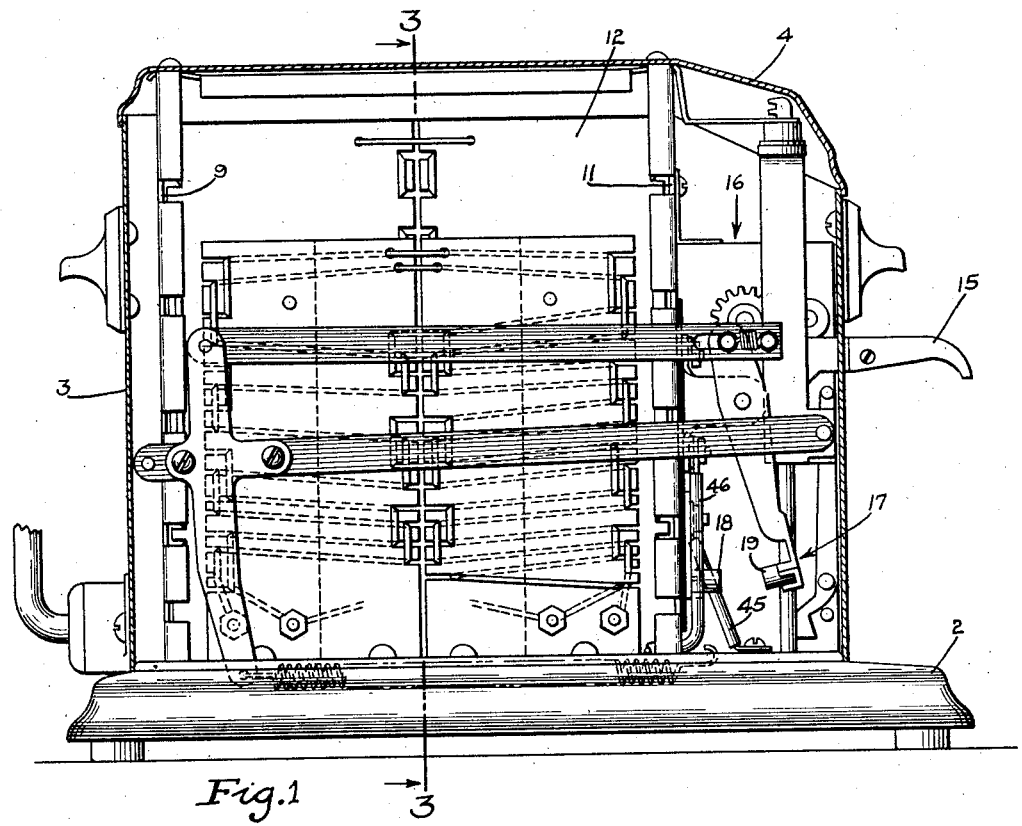
Figure 1 is a longitudinal vertical sectional view of a toaster, with some of the parts omitted to more clearly illustrate the arrangement of the resistance elements within the toaster oven.
Figure 2:
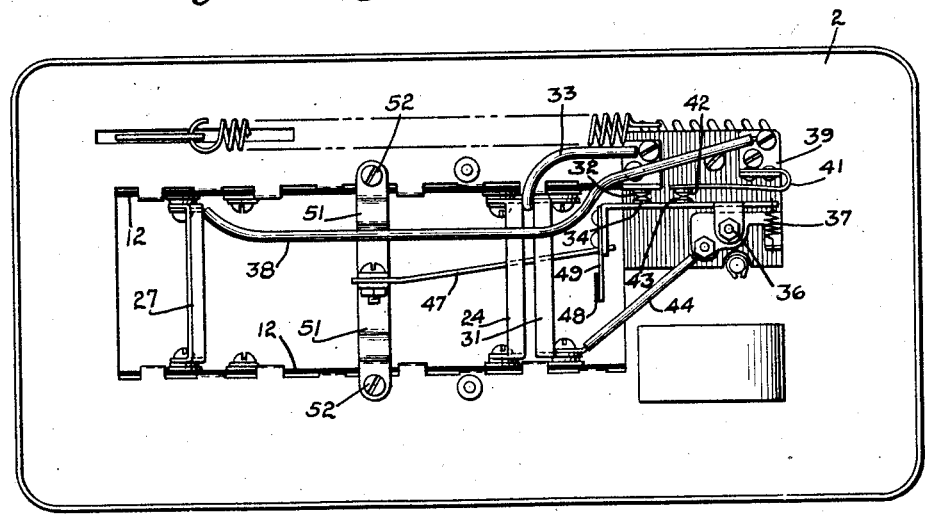
Figure 2 is a bottom view of Figure 1 with some of the parts omitted to more clearly illustrate the novel switch mechanism.
Figure 3:
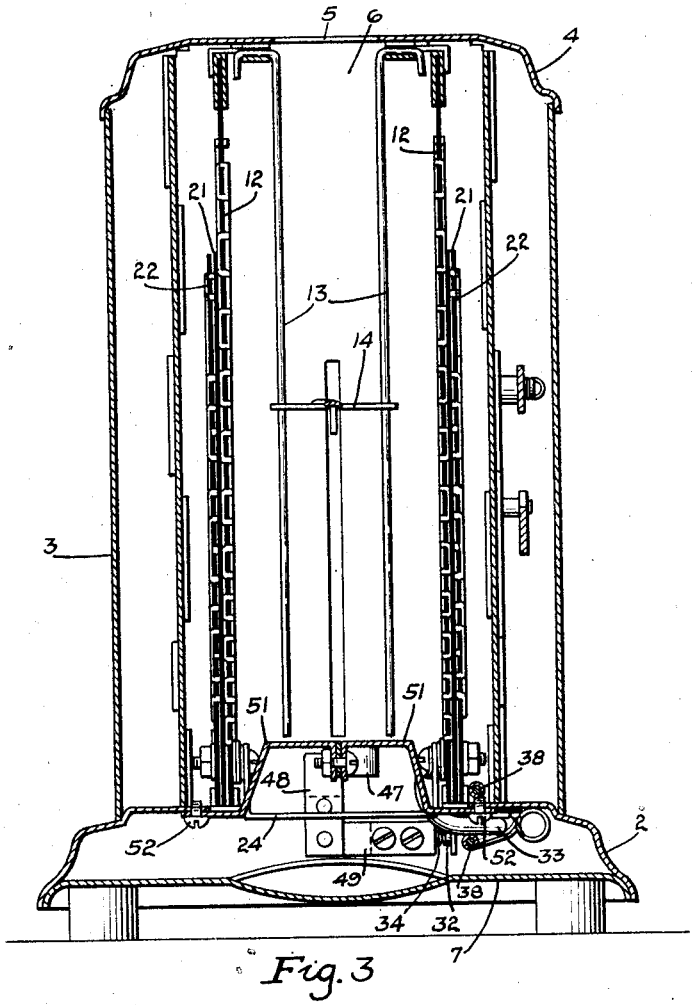
Figure 3 is a vertical cross-sectional view on the line 3—3 of Figure 1, showing the arrangement of the heating elements and resistance elements within the toaster oven.
Figure 4:
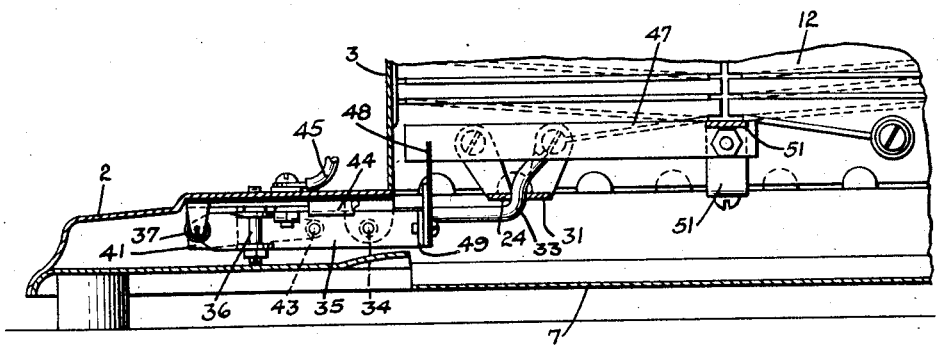
Figure 4 is a detail vertical sectional view of a portion of the toaster showing the arrangement of the switch mechanism in the lower portion of the toaster.

In the selected embodiment of the invention here shown, for purposes of disclosure, there is illustrated in Figures 1 and 2, a toaster comprising a base 2, preferably formed of sheet metal and having an outer casing, generally indicated by the numeral 3, suitably mounted thereon. A top plate 4 is suitably secured to the upper portion of the casing 3 to provide a top closure therefor, and has a bread receiving opening or slot 5 therein, which communicates directly with the oven or heating compartment 6. A bottom plate 7 is removably secured to the base 2 and normally conceals the switch mechanism provided in the lower portion of the toaster, as best shown in Figures 3 and 4.

The oven or toasting compartment is defined by end walls 9 and 11 suitably supported within the casing 3, and the heating elements 12, which, in effect, define the side walls of the oven. Guide rods 13 are arranged within the toasting chamber or oven, and are spaced from the heating elements 12 to prevent the bread from contacting directly therewith. A bread carrier 14 is mounted within the oven and has a handle 15 conveniently located at the front of the toaster for moving the bread carrier in the oven. This handle is operatively associated with a timing mechanism constituting a variable speed clock mechanism, generally indicated by the numeral 16 in Figure 1. This clock mechanism is shown in detail in my pending application, above mentioned, and will therefore not be described in detail, inasmuch as it forms no part of the present invention. It is to be understood, however, that the clock mechanism is reset or wound each time the lever 15 is depressed to move the bread carrier into bread toasting position, and after a predetermined time interval, said clock mechanism will release the carrier, whereby it is returned to its normal inoperative or non-toasting position.

Depression of the lever 15 also effects the closing of the main control switch of the toaster, generally indicated by the numeral 17, and shown comprising a fixed contact 18 and a movable contact 19. This switch is automatically opened when the bread carrier is released.

An important feature of the present invention resides in the means provided for quickly heating the toasting chamber or oven 6 upon initial starting of the toaster, whereby the length of time required to toast the first slice is shortened to substantially the time required to toast each succeeding slice. To thus quickly heat the oven, upon initial starting of the toaster, resistance elements 21 and 22 are connected in series with the main heating elements 12, and are normally cut out of the circuit, when the toaster is cold, and are adapted to be successively connected into the heating circuit, as the oven 6 gradually becomes heated, as will subsequently be described.

Figure 5:
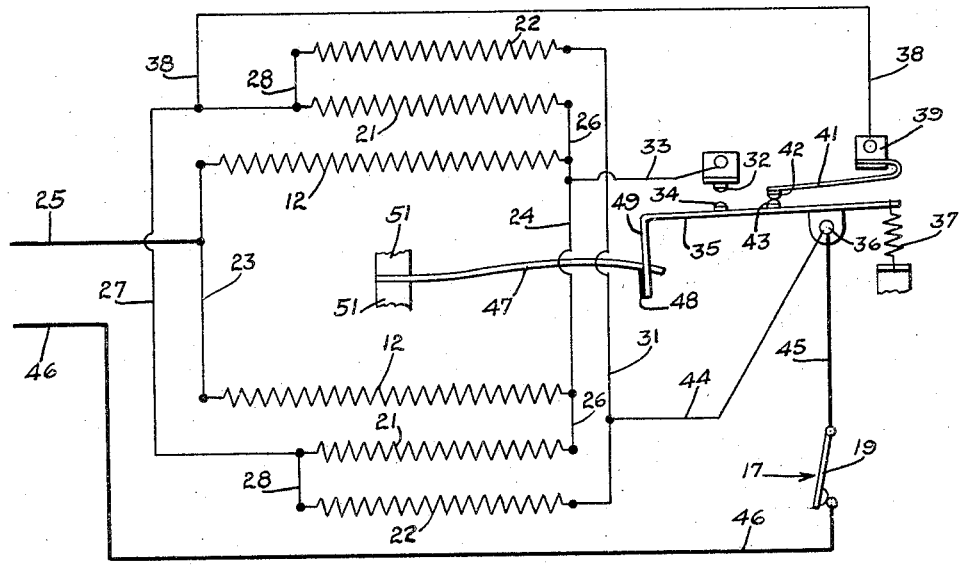
Figure 5 is a wiring diagram showing the connections between the heating element and resistance elements, and showing the switch mechanism positioned for the medium heat circuit.

As shown in the wiring diagram in Figure 5, the heating elements 12 have their opposite ends connected by wires 23 and 24, whereby said elements are connected in parallel. A main line wire 25 is shown connected to the wire 23, and constitutes a part of the usual electric cord, whereby the toaster may be connected to an electric receptacle.

The resistance elements 21 are shown connected at one end to the main heating elements 12 by wires 26, and have their opposite ends electrically connected together by a wire 27, whereby said resistance elements 21 are connected in parallel with respect to one another, but in series with the heating elements 12. The ends of the resistance elements 21 which are connected to the wire 27, are also connected by wires 28 to the ends of the resistance elements 22, the opposite ends of which are connected together by a wire 31, whereby said elements 22 are connected in parallel with respect to one another, and in series with the heating elements 12 and 21.

The means provided for automatically cutting the resistance elements 21 and 22 into and out of the heating circuit is shown comprising a switch mechanism including a fixed contact 32 connected by a wire 33 to the wire 24 of the heating elements 12. The contact 32 is adapted to be electrically engaged by a movable contact 34, carried by an arm 35 mounted for swinging movement about a pivot 36. A suitable spring 37 is connected to the arm 35 and constantly urges it in a direction to move the contact 34 into engagement with the contact 32. The wire 27 of the resistance elements 21 is connected by a wire 38 to a contact clip 39, to which one end of a flexible member 41 is connected. This flexible member carries a contact 42 normally electrically engaging a contact 43 carried by the arm 35. The wire 31 of the resistance elements 22 is connected by a wire 44 to the terminal or pivot 36 of the arm 35, and a wire 45 connects this same terminal 36 to the movable contact 19 of the main control switch 17. The fixed contact 18 of the main switch 17 is connected to the other side of the main line by a wire 46 which, like the wire 25 leads to the source of electric supply.

The means provided for automatically controlling the opening and closing of the switch contacts 32—34 and 42—43 of the resistance elements 21 and 22, is shown comprising a thermo-bar, generally indicated by the numeral 47, and having its free end adapted to engage a strip of insulating material 48 suitably secured to an offset end portion 49 of the arm 35. The thermo-bar 47 is shown having its fixed end secured to suitable brackets 51, which may be secured to the upper wall of the base 2 by suitable screws 52, as best shown in Figure 3. This thermo-bar, it will be noted by reference to Figures 2, 3, and 4, is located in the lower portion of the toasting chamber or oven, where it is influenced by convection currents therein so that as the toasting chamber becomes heated, upon initial starting of the toaster, the movable end of the thermo-bar is gradually warped in a direction towards the insulating strip 48 on the arm 35 and subsequently engages it whereby continued warping of the thermo-bar will swing the arm 35 in a direction to move the contacts 34 and 43, carried thereby, out of electrical engagement with their respective contacts 32 and 42.

Operation

In the operation of this novel toaster, a slice of bread is inserted through the slot 5 in the upper wall 4 of the toaster onto the carrier 14, and the latter is then moved into toasting position within the oven by depressing the lever 15. Such actuation of the lever 15, as hereinbefore stated, winds the clock mechanism 16 and, at the same time, closes the main switch 17, whereby current is supplied to the heating elements 12 by the following circuit: wires 25 and 23, heating elements 12, wires 24 and 33, contacts 32—34, arm 35, terminal 36, wire 45 main switch 17 and wire 46 which completes the circuit.

When the toaster is initially started, the thermo-bar 47 is in its normal inoperative position as shown in Figure 2, whereby the contacts 32—34 and 42—43 are in circuit closing position. Because of the contacts 32 and 34 being thus electrically engaged, the current flowing through the heating elements 12 will take the path of least resistance which is as above described. Thus, it will be seen that when the toaster is initially started, the current will not flow through the resistance elements 21 and 22, whereby the heating elements 12 will operate at high heat, and will thus quickly heat the oven to toasting temperature.

When the oven has been heated to a predetermined temperature, the thermo-bar 47 will engage the insulating strip 48 of the arm 35 and move said arm in a direction to move the contact 34 out of electrical connection with the contact 32, whereupon current flow through the wire 33 is immediately interrupted, as will be clearly understood by reference to Figure 5.

When the switch arm 35 is positioned as shown in Figure 5, the current will flow from the main heating elements 12 through the wire 26, resistance elements 21, wires 27 and 38, contact clip 39, flexible member 41, contacts 42—43, and arm 35, to the terminal 36, and thence back to the main line through wires 45, switch 17, and wire 46. Thus, when the contacts 32 and 34 are initially opened, the current will flow through the heating elements 12 and the resistance elements 21, as above described, and thereby cause the heating elements to operate at medium heat.

As the temperature of the oven continues to rise, the thermo-bar 47 is further warped until the arm 35 is swung sufficiently to move the contact 43 out of electrical connection with the contact 42. When this occurs, the current will flow through all of the resistance elements 21 and 22, and thereby cause the heating elements to operate at low heat. This low heat circuit is as follows: wires 25 and 23, heating elements 12, wires 26, heating elements 21, wires 28, heating elements 22, wires 31 and 44, terminal 36, wire 45, switch 17, and wire 46, whereby the circuit is completed.

Figure 6:
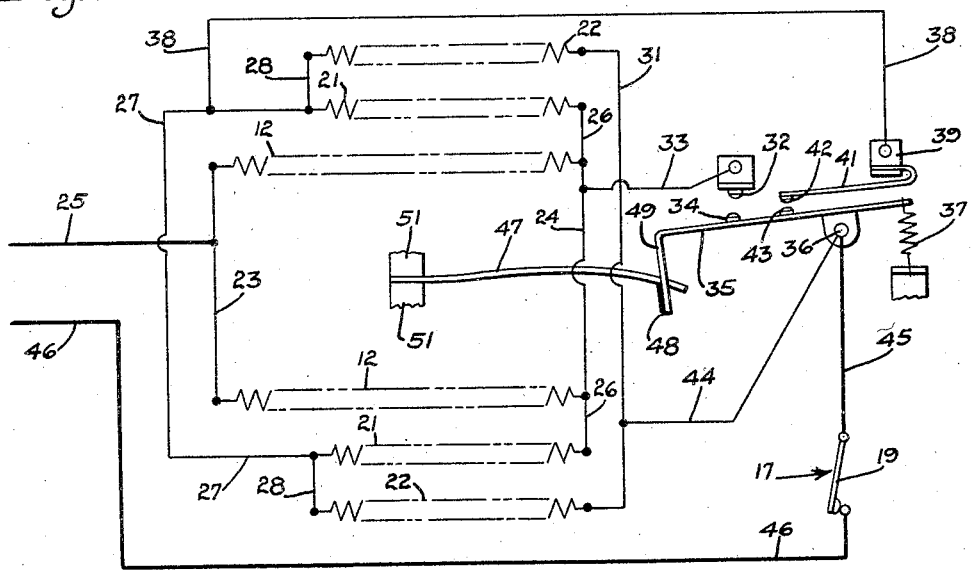
Figure 6 is a similar view but showing the switch mechanism operated to provide the low heat circuit.

The contacts 32—34 and 42—43 are so arranged that they are successively opened. In other words, because of the contact 42 being carried by the flexible member 41, when the arm 35 is swung in a direction to move the contact 34 out of electrical connection with the contact 32, the contact 42 will follow its complemental contact 43 until the contact 34 has moved fully out of engagement with the contact 32, after which, continued swinging movement of the arm 35 will move the contact 43 out of electrical connection with the contact 42, as clearly illustrated in Figure 6.

The entire operation of the above switch mechanism is accomplished in a comparatively short interval of time as, for example, one and one-quarter minutes or less, and it is entirely automatic, being controlled entirely by the temperature of the toasting chamber or oven. Upon completion of each toasting period, the main control switch 17 is automatically opened, whereupon the current flow through the heating elements is immediately interrupted. Should the toaster be promptly turned on again by depressing the lever 15, and before sufficient time has elapsed to allow the oven to cool, the thermo-bar 47 may still be warped sufficiently to hold the contacts of the auxiliary heating elements out of electrical connection with one another, whereupon the low heat circuit will again commence to function. Should the oven have cooled sufficiently to allow the thermo-bar to recede to the extent that the contact 43 has electrically engaged the contact 42, then, when the toaster is again started, the medium heat circuit will function. Again, if sufficient time has elapsed from the time the toasting operation was interrupted, before the toaster is again started, to allow the oven to cool to the extent that the thermo-bar has returned to its normal inoperative position, shown in Figure 2, then when the toaster is again started, the high heat circuit will function and thereby quickly restore the heat in the oven to toasting temperature, after which the resistances 21 and 22 will again automatically successively be cut into the circuit, as above described.

The novel invention herein disclosed is very simple and inexpensive in construction and in actual use, has been found very accurate and efficient in operation. In the drawings, I have shown two sets of resistance elements, and a corresponding number of contacts for controlling the operation of said resistance elements. It is to be understood, however, that the number of resistance elements employed in connection with the heating elements 12 may be varied, as desired. For example, if only the resistance elements 21 are employed, the swinging arm 35 will carry but a single contact, and if three sets of resistance elements were used in connection with the heating elements 12, the switch arm 35 would carry three contacts. It will thus be seen that the number of resistance elements used in connection with the heating elements 12 may readily be varied to meet certain specific requirements, without departing from the scope of the invention.

The automatic heat control mechanism herein disclosed will function equally well whether used in connection with a variable speed time control mechanism, such as shown in my afore-mentioned pending application, or, if used with a constant speed time control mechanism, such as are provided upon various automatic toasters now in common use.

I claim as my invention:

1. A toaster comprising an oven provided with suitable heating elements, an electric circuit for said heating elements, a plurality of resistance elements connected in series with said heating elements, a switch mechanism for controlling the operation of said resistance elements whereby when the toaster is initially started, said heating elements will operate at high heat to thereby quickly heat the oven to a predetermined temperature, said switch mechanism comprising a pivoted member carrying a plurality of contacts normally engaged with complemental contacts, and a thermo-bar operatively associated with said pivoted member and positioned to be influenced by variations in oven temperatures, whereby when the oven is heated to a predetermined temperature, said switch mechanism will operate to automatically successively connect said resistance elements in the heating circuit to thereby cause the heating elements to successively operate at lower temperatures and thereby cause the bread slices to be uniformly toasted.

2. The combination with a toaster comprising an oven having suitable heating elements therein, a bread carrier for supporting a bread slice in said oven, an electric circuit for said heating elements having a switch therein, and a member for depressing the bread carrier into said oven and whereby said switch is simultaneously closed, of means for causing said heating elements to operate at different temperatures, comprising a plurality of resistance elements connected in series with said heating elements, a switch mechanism including a pivoted member carrying a plurality of contacts normally electrically engaged with complemental contacts, all of said contacts being electrically associated with said resistance elements, and a thermo-bar positioned to be influenced by variations in the temperature of the oven, whereby when the toaster is initially started, the heating elements will operate at high heat, to quickly heat the oven, and when the oven has been heated to a predetermined temperature, said thermo-bar will actuate said pivoted member, whereby said contacts will be successively opened to thereby cause the resistance elements to be successively connected in the heating circuit, whereby said heating elements will successively operate at different temperatures, until the oven reaches a predetermined temperature desirable for toasting, after which the temperature of the oven will be maintained substantially constant to thereby cause all of the bread slices to be uniformly toasted.

3. Apparatus for controlling the temperature within a confined area, comprising heating elements, a plurality of resistance elements electrically associated with the heating elements, and a switch mechanism for automatically connecting the resistance elements into the heating circuit or disconnecting them therefrom in accordance with temperature changes within said confined area, said switch mechanism including a pivoted member normally engaging a plurality of contacts electrically connected to the resistance elements, and a thermo-bar operatively engaged with said pivoted member and responsive to temperature changes within said area, thereby to control the operation of the pivoted member, and whereby the resistance elements may be successively connected into the heating circuit, after initial starting of the apparatus, to thereby prevent overheating thereof.

4. Apparatus for controlling the temperature within a confined area, comprising heating elements, a plurality of resistance elements electrically associated with the heating elements, and an electric circuit for said heating and resistance elements including a switch mechanism for automatically connecting the resistance elements into the heating circuit or disconnecting them therefrom in accordance with temperature changes within said confined area, said switch mechanism including a pivoted member normally engaging a relatively fixed contact and a movable contact, both of which contacts are electrically connected to the resistance elements, and a thermo-bar operatively engaged with said pivoted member and responsive to temperature changes within said area, thereby to actuate said pivoted member, whereby it is first moved out of electrical engagement with said relatively fixed contact, whereby certain of said resistance elements are connected in the heating circuit, and upon continued movement of said pivoted member by the thermo-bar it subsequently disengages said movable contact, whereby additional resistance is interposed in circuit with the heating element thereby to further lower the temperature thereof.

5. Apparatus for controlling the temperature within a confined area, comprising a heating means, resistance elements electrically associated with the heating means to constitute a heating circuit, a relatively fixed contact electrically connected to the heating means and said resistance elements, a movable contact also connected to the resistance elements, a pivoted member normally engaging said contacts whereby said resistance elements are cut out of the heating circuit, and a temperature responsive element positioned to be influenced by variations in the temperature within said confined area, said temperature responsive member being operatively engaged with the pivoted switch member and adapted upon temperature rises within said area to operate said switch member and cause it to successively move out of electrical engagement with said fixed and said movable contacts, whereby the resistance elements are successively interposed in the heating circuit, as the temperature within said confined area rises, thereby preventing overheating of said area, and whereby it will subsequently be maintained at substantially a constant temperature.

6. Apparatus for controlling temperature, comprising a heating element, a plurality of resistance elements electrically associated with the heating element and a switch mechanism for automatically connecting or disconnecting them therefrom in accordance with temperature changes adjacent said main heater, said switch mechanism including a plurality of contacts electrically connected to the resistance elements and the heating element, a pivotally mounted contact arm normally spring biased into engagement with the contacts and a thermally-actuable member operatively engaged with the contact arm and responsive to temperature changes adjacent the main heater to actuate said contact arm to first effect disengagement thereof with one contact whereby certain of said resistance elements are connected in series circuit with the heating element and upon further movement of the contact arm by the thermally actuable member it is disengaged from a second contact to connect additional resistance in series circuit with the heating element to further lower the temperature thereof.

7. A toaster comprising a heating element, a plurality of resistance elements permanently electrically connected in series circuit with the heating element and a switch mechanism for controlling the operation of said resistance elements whereby when the toaster is initially started said heating element will operate at high heat to thereby quickly heat the toaster to a predetermined temperature, said switch mechanism comprising a plurality of contact members electrically connected to the heating element and the resistance elements, a pivotally mounted contact arm normally spring biased into engagement with the contact members to short circuit said resistance elements, and a thermally-actuable member operatively associated with the contact arm and subjected to variations in toaster temperature and effective upon increase in toaster temperature to move the contact arm to successively disengage it from the respective contact members to connect the resistance elements in circuit with the heating element to cause the heating element to operate at lower temperatures and cause successive slices of bread to be uniformly toasted.

8. An electric toaster comprising a main electric heating element, a plurality of resistance elements electrically connected to said main heating element, a plurality of contacts electrically connected to the main heating element and to the resistance elements, a contact arm normally spring biased into engagement with the plurality of contacts and a thermo-bar subject to the temperature of the toaster operatively engaging the contact arm and effective to cause movement thereof to successively connect the resistance elements in circuit with the main heating element after initial starting of the toaster to cause the main heating element to operate at successively lower temperatures and thereby cause successive slices of bread placed in the toaster to be toasted to substantially the same degree.

9. In an electric toaster the combination with main heating elements and an electric circuit for said main heating elements, of means for controlling the energization of the main heating elements to cause successive slices of bread placed in the toaster to be uniformly toasted, comprising a plurality of resistance elements connected in series with said main heating elements, a switch mechanism including relatively fixed and movable contacts electrically connected to the resistance elements and the main heating elements, a contact arm normally spring-biased into engagement with said contacts and a thermally-actuable element responsive to temperature changes in the toaster operatively engaging the contact arm to move it out of engagement with said fixed contact and then with said movable contact upon increase of temperature in the toaster and into engagement with the movable contact and then with said fixed contact upon decrease of temperature in the toaster to cause all slices of bread placed in said toaster to be toasted to substantially the same degree.

MURRAY IRELAND.